United States Patent [19]
Gillemot et al.

[11] Patent Number: 4,515,497
[45] Date of Patent: May 7, 1985

[54] CLAMPING ELEMENT FOR THE RELEASABLE FASTENING OF SPATIALLY ARRANGED, OR PARALLEL BARS, TUBES AND SIMILAR OBJECTS

[75] Inventors: László Gillemot; János Prodán; Endre Pataki; Ernö Zuckermann, all of Budapest, Hungary

[73] Assignee: Magyar Aluminiumipari Tröszt, Budapest, Hungary

[21] Appl. No.: 433,574

[22] Filed: Oct. 12, 1982

[30] Foreign Application Priority Data

Oct. 26, 1981 [HU] Hungary ..................................... 3139

[51] Int. Cl.³ .............................................. F16B 7/04
[52] U.S. Cl. .................................... 403/391; 403/379; 403/374
[58] Field of Search ............... 403/391, 390, 396, 400, 403/376, 379, 324, 409, 374

[56] References Cited

U.S. PATENT DOCUMENTS

| 2,168,499 | 8/1939 | Spicacci | 403/379 X |
| 2,313,280 | 3/1943 | Szego | 403/400 X |
| 3,109,617 | 11/1963 | Meyer et al. | 403/324 X |
| 3,796,464 | 3/1974 | Hansen et al. | 403/378 X |
| 4,066,371 | 1/1978 | Chapman | 403/391 X |
| 4,371,281 | 2/1983 | Magnér | 403/374 X |

FOREIGN PATENT DOCUMENTS

| 2308093 | 9/1974 | Fed. Rep. of Germany . |
| 2801176 | 9/1978 | Fed. Rep. of Germany . |
| 2903119 | 7/1980 | Fed. Rep. of Germany . |
| 1418470 | 10/1965 | France | 403/400 |

Primary Examiner—Andrew V. Kundrat
Attorney, Agent, or Firm—Gabriel P. Katona

[57] ABSTRACT

The clamping element for the releasable fastening of spatially arranged or parallel bars, tubes and similar objects has a basic body comprising at least one fixing hole and two or three, but in given case several inlet holes for each fixing hole, penetrating the fixing hole, parallel with and/or by-passing each other, and tensioning insert arranged in the fixing holes. The tensioning insert has recesses corresponding to the penetrations and it is formed as to allow its tensioning in axial direction. The basic body is preferably spherical, cylindrical or prismatic.

9 Claims, 5 Drawing Figures

CLAMPING ELEMENT FOR THE RELEASABLE FASTENING OF SPATIALLY ARRANGED, OR PARALLEL BARS, TUBES AND SIMILAR OBJECTS

The invention relates to a clamping element which ensures releasable fastening to each other spatially arranged, including parallel arrangements bars, tubes and similar objects. Bar, tube or shaped piece of any cross section are suitable for application of this invention. For the sake of simplicity hereinafter these are referred to as bars.

As known, the bars used in industrial construction, maintenance, industrial furniture and installation scaffolding systems are fixed to each other with the use of clamp, fish-plate, lapped or similar fastenings. These are described, for instance, in the GFR patent disclosure No. 2 903 119, 2 308 093 and 2 801 176. A drawback of the known releasable fasteners of this type is that several clamping elements are required for fastening and furthermore they are generally suitable for the interconnection of 2 bars only.

Development of the clamping elements was directed toward the use of minimal number of components, as a result of which assembly and disassembly of the bars would be simple and the fastening more solid and safe. The clamping element described in the U.S. Pat. No. 4,066,371 is partially suitable for this purpose. This consists of a housing comprising holes corresponding to the bars to be fixed and a fixing hole in contact with the holes. A tapered clamping insert tightened with screw in axial direction is provided as well as nut suitable for tightening the clamping insert. The clamping insert is in contact with the bars arranged in the holes geometrically along each edge. After tightening the clamping insert, this contact secures the fastening. The advantage of this clamping element is its simple, easy handling which by its holes determines the spatial position of the interconnected bars. However, on the other hand its drawbacks are that the fastening is not sufficiently stable nor uniform.

An object of this invention is aimed at the realization of an improved clamping element which has all the advantages of the former clamping element, while at the same time allows for solid, safe and uniform fastening.

A further object of this invention is to provide an arrangement having the least possible elements and a clamping element that is producible by means of a simple technology.

The problem is solved, according to this invention, by means of a clamping element for the releasable interconnection of spatially including parallel arranged bars, tubes or similar elements, which consists of a basic body including at least one fixing hole and two or three, but in a given case several by-pass inlet holes for each fixing hole, the inlet holes penetrate the fixing hole and the clamping insert is arranged in the fixing hole(s) and tightened in axial direction, the clamping insert comprises a profile with parallel generatrix and has recesses of suitable shape and arrangement for the penetrations.

The outer shape of the basic body is not critical from the point of view of the invention. It may be selected according to the demands of application and production-technological aspects. However, the basic body is preferably spherical, but it may be cylindrical, or prismatic as well.

Material used for the basic body is selected according to the expectable load bearing: it is made generally of metal, preferably of aluminium, but any other material, thus synthetic material is also suitable.

The basic body has one or several fixing hole(s). If it has several fixing holes, they may be parallel with, or by-passing each other, their cross section and size are identical or different. The fixing holes are preferably of circular cross section, but other for instance polygonal cross section is also applicable.

When the basic body has several fixing holes, then its parts containing the fixing holes may be formed rotatably in relation to each other.

Each fixing hole is generally associated with two or three penetrating inlet holes. However the basic body may have more than these numbers of holes inlet holes as well associated with a fixing hole. Cross section and size of the inlet holes correspond to the cross section and size of the bars to be fastened. The inlet holes are generally by-passing each other, but they may be arranged parallel with each other as well. The spatial arrangement of their axes is determined by the angle of the bars to be fixed to each other.

Size of the inlet holes may differ from each other and from the fixing hole. The suitable proportion of the fixing hole and inlet holes as well as the extent of penetration are determined by strength of the material of the clamping element and by its utilization.

A bolt-type tensioning insert is arranged in the fixing hole on which recesses matching the penetrations are found. The tensioning insert acts in axial direction, e.g. in such a way, that one end is threaded in axial direction and tensioning screw is arranged in the threaded end. It may also be advantageous to have an arrangement wherein the thread is on the clamping insert with a nut screwed thereon. In some cases a guide lock is provided at the end of the clamping insert opposite the clamping, which is engaged with the groove formed in the basic body.

The guide lock is advantageous first of all in circular cross sectional clamping inserts, since it prevents their undesirable turn.

The invention is described in detail with the aid of diagrams showing the construction by way of example, as follows:

FIG. 1: Plan view and partial section showing a preferable construction of the basic bodies of the clamping element;

FIG. 2: Plan view and partial section showing the tensioning element for the basic body according to FIG. 1;

FIG. 3: Plan view showing another preferable construction of the basic body, where the inlet holes are of hexagonal cross section.

Figure 1:
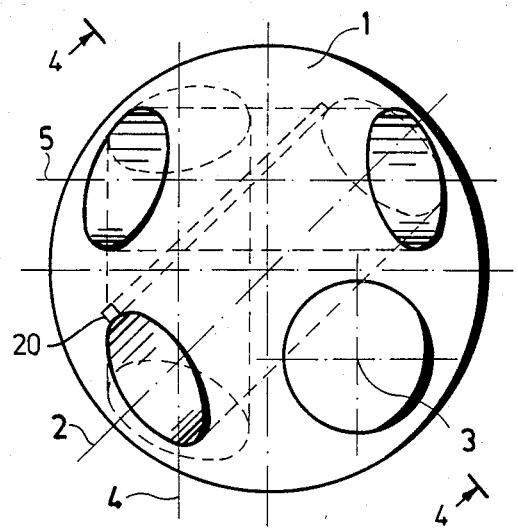
Figure 2:
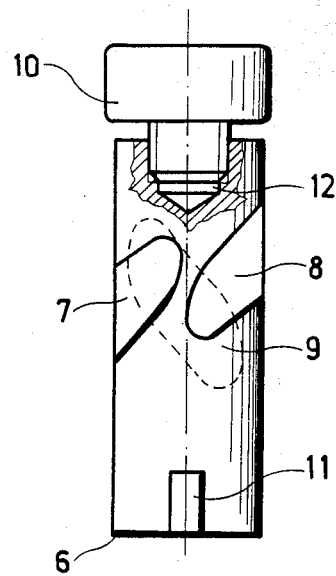
Figure 3:
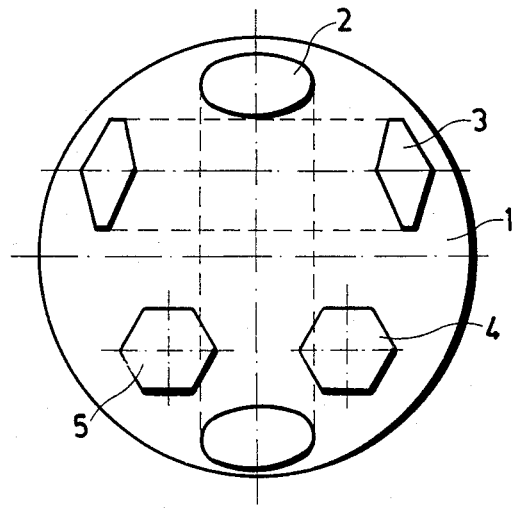

In the construction presented in FIGS. 1 and 2, the basic body 1 is spherical and it is provided with cylindrical fixing hole 2. Furthermore, it has inlet holes 3, 4 and 5 by-passing the fixing hole 2 for receiving the bars to be fastened. Inlet holes 3, 4 and 5 are in by-passing arrangement in relation to each other and each penetrates the fixing hole 2. Clamping insert 6 can be arranged in the fixing hole 2, the cylindrical jacket of which is provided with recesses 7, 8 and 9, the shape and arrangement of which match the said penetrations as shown in FIG. 2. An axially oriented threaded hole 12 is found at one end of the tensioning insert 6, into which a tensioning screw 10 is screwed in. A guide piece 11 is at the opposite end of the clamping insert 6, fitting into the groove 20 formed in the basic body 1 and shown in dotted line in FIG. 1. Inlet holes 4 and 5 are parallel with each other. The embodiment of this invention shown in FIG. 3 contains a basic body 1 provided with a fixing hole 2 of circular cross section. This is further provided with inlet holes 3, 4 and 5, wherein all of said inlet holes penetrate through fixing hole 2 and inlet holes 4 and 5 are parallel to each other.

The clamping element according to the invention is suitable for the assembly of the bars when the clamping insert 6 is fitted into the basic body 1. The clamping insert 6 is arranged in the basic body 1, as to have the recesses 7, 8 and 9 corresponding to the penetrations in their proper positions, i.e. as to fit the respective bars into the inlet holes 3, 4 and 5 without difficulty. Fitting of the bars is followed by tightening the tensioning screw 10, as a result of which the tensioning screw head head sits on the basic body 1 and moves the clamping insert 6 in an axial direction. Thus the clamping insert 6 will become extended over the bars along recesses 7, 8, 9. This way the fastening can be accomplished by tightening a single screw.

Figure 4:
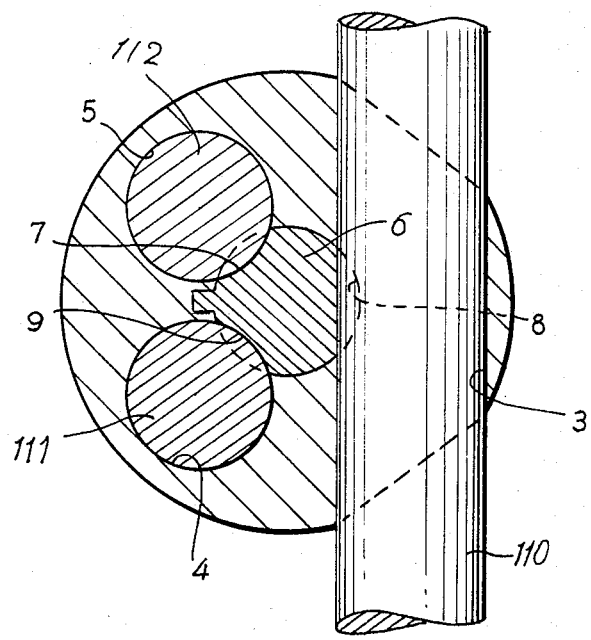
FIG. 4 is a cross-sectional view taken generally along line 4—4 of FIG. 1 showing the securing elements and construction elements in place.
Figure 5:
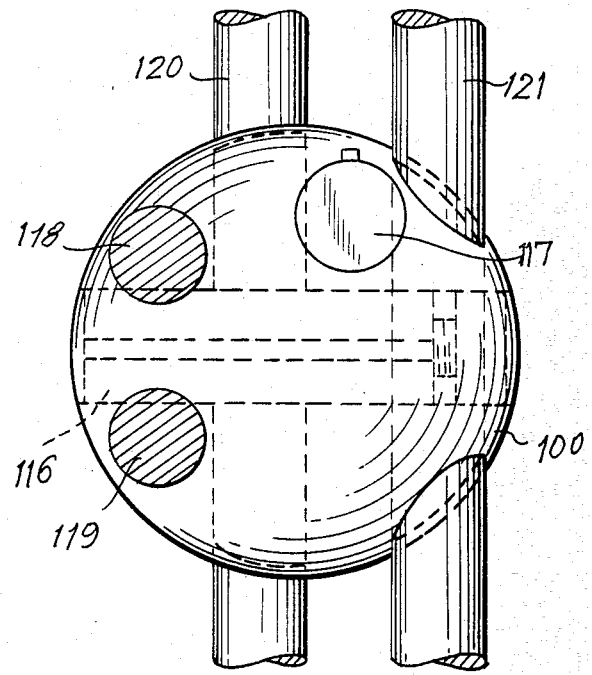
FIG. 5 is another modification of this invention utilizing two securing elements.

The cross-sectional view of FIG. 1 shown in FIG. 4 shows the relationship of the tubular construction elements to each other and to the clamping insert elements. The tubular construction elements as shown at 110, 111 and 112, 111 and 112 being cross-sectional views of these elements and 110 showing the element in perspective. The clamping insert element 6 is also shown here in cross section. The modification of this invention shown in FIG. 5 illustrates the use of a plurality of fixing pieces and bores. As in the case with the modification shown in FIGS. 1-4, the basic body 100 takes the form of a sphere. A plurality of tubular construction elements are shown at 118, 119, 120 and 121. In a manner equivalent to that shown in FIGS. 1-4, the modification shown in FIG. 5 is provided with a plurality of clamping inserts 116 and 117.

The clamping element according to the invention can be produced in a simple way. The basic body and clamping insert 6 are produced suitably from the same material. If the structural element is metal, then the basic body 1 and tensioning insert 6 are preferably produced by casting, or if synthetic material then by injection moulding.

The elements subjected to intensive use are produced suitably by forging, but the clamping element may be produced also by machining of the fitting parts. The holes are made in the conventional way, suitably in such a manner, that first the fixing hole 2 is made in the geometric centreline of the basic body 1, then the tensioning insert 6 is arranged in the hole and thus the inlet holes 3, 4 and 5 are prepared. If the tensioning insert 6 is of circular cross section, then it has to be secured against turning during the latter process. This can be achieved for instance by use of the earlier mentioned guide lock 11. In certain cases, thus for instance in case of mass production it is better to form the inlet holes 3, 4 and 5 independently from the tensioning insert 6.

Main advantages of the clamping element according to the invention in contrast with the known solutions are the following:

it ensures fastening of high strength without excessive surface load of the bar-system;

it allows uniform fastening in all spatial directions;

the force effect of the clamping element is partically the same on all bars;

its formation is aesthetic, if necessary it may be enhanced even with surface treatment;

by applying the law of similars, clamping element can be formed fitting the profiles in size as well;

in case of bars and tubes having different size from the standard, the suitable member of the size-family can be converted subsequently too to the required size.

What we claim is:

1. A clamping element for the releasable interconnection of spatially arranged bars or tubes comprising:
    a basic body including at least one fixing hole for receiving a clamping insert, and at least two inlet holes for receiving bars or tubes, said inlet holes being arranged in parallel or by-pass relationship with respect to each other and disposed to penetrate said fixing hole, and
    (b) a clamping insert arranged in said fixing hole, said clamping insert being tightenable in its axial direction; the surface of said clamping insert being provided with curved recesses cut into said surface, said recesses being shaped to cradle and to contact along its whole surface said bars or tubes that are arranged in said inlet holes, said clamping insert having a profile with parallel generatrix.

2. A clamping element as claimed in claim 1 in which the clamping insert contains an axially oriented threaded hole and a tensioning screw screwed into said threaded hole.

3. A clamping element as claimed in claim 1 in which the clamping insert contains of a threaded bolt formed on said clamping insert and a screw nut fitting onto said threaded bolt.

4. A clamping element as claimed in claim 1 in which a guide element is provided at the end of said clamping insert opposite the end of said clamping insert which tightens said clamping element and a groove receiving element is arranged in said basic body.

5. A clamping element as claimed in claim 1 in which said basic body is spherical.

6. A clamping element as claimed in claim 1 in which said basic body is cylindrical or prismatic in shape.

7. A clamping element as claimed in claim 1, in which said fixing holes and clamping insert have circular cross section.

8. A clamping element as claimed in claim 1 in which said inlet holes have rectangular or hexagonal cross section.

9. A clamping element as claimed in claim 1 in which the clamping insert contains a threaded bolt formed on said clamping insert.

* * * * *